United States Patent

Cano et al.

[11] Patent Number: 6,051,310
[45] Date of Patent: Apr. 18, 2000

[54] OPHTHALMIC LENS MADE OF ORGANIC GLASS WITH A SHOCKPROOF INTERMEDIATE LAYER, AND METHOD FOR MAKING SAME

[75] Inventors: Jean Paul Cano, Chennevières sur Marne; Yves Leclaire, Combs-la-Ville; Anne Robert, Créteil, all of France

[73] Assignee: Essilor International-Compagnie Generale D'Optique, France

[21] Appl. No.: 08/682,602

[22] PCT Filed: Jun. 20, 1995

[86] PCT No.: PCT/FR95/00812

§ 371 Date: May 7, 1997

§ 102(e) Date: May 7, 1997

[87] PCT Pub. No.: WO96/00403

PCT Pub. Date: Jan. 4, 1996

[30] Foreign Application Priority Data

Jun. 27, 1994 [FR] France .................................. 94 07877

[51] Int. Cl.[7] .............................. G02B 1/10; G02B 1/04; C08J 7/04
[52] U.S. Cl. .......................... 428/336; 351/44; 351/159; 351/166; 427/162; 427/164; 427/166; 427/167; 427/168; 427/169; 427/533; 427/534; 427/536; 427/539; 428/412; 428/425.5; 428/447; 428/448; 428/451
[58] Field of Search ............................ 351/44, 159, 166; 428/336, 425.5, 412, 447, 448, 451; 427/533, 534, 536, 539, 162, 164, 166, 167, 168, 169

[56] References Cited

U.S. PATENT DOCUMENTS 4,904,525 2/1990 Taniguchi et al. ....................... 428/328

5,015,523 5/1991 Kawashima et al. ................... 428/336

FOREIGN PATENT DOCUMENTS 0 404 111 6/1990 European Pat. Off. .
63-141001 6/1988 Japan .

OTHER PUBLICATIONS

Derwent Publications Ltd., Japanese Patent No. 63–87223, Hoya Corp.

*Primary Examiner*—D. S. Nakarani
*Attorney, Agent, or Firm*—O'Keefe, Egan & Peterman

[57] ABSTRACT

An ophthalmic lens consisting of a substrate made of organic glass, of an abrasion-resistant coating, of a layer of impact-resistant primer and of an inorganic antireflective coating, wherein the surface of the said substrate is covered with the abrasion-resistant coating and in that the impact-resistant primer layer is inserted between the said abrasion-resistant layer and the anti-reflective coating, wherein the abrasion-resistant coating comprises a hydrolyzate or a mixture of hydrolyzates of a silane compound of formula:

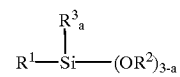

in which:

$R^1$ denotes an organic group containing an epoxy group;
$R^2$ is a hydrocarbon radical which has 1 or 2 carbon atoms; and
$R^3$ is a hydrocarbon group which has from 1 to 4 carbon atoms, and a is 0 or 1 in value.

21 Claims, No Drawings

OPHTHALMIC LENS MADE OF ORGANIC GLASS WITH A SHOCKPROOF INTERMEDIATE LAYER, AND METHOD FOR MAKING SAME

BACKGROUND OF INVENTION

The present invention relates to an ophthalmic lens made of organic glass with an impact-resistant interlayer and to a process for its manufacture.

Ophthalmic lenses made of organic glass are more sensitive to scratching and to abrasion than those made of inorganic glass.

It is known to protect surface of this type of lens with hard coatings, generally of the polysiloxane type.

It is also known to treat lenses made of organic glass so as to prevent the formation of interfering reflections which are troublesome for the wearer of the lens and his or her interlocutors. The lens then comprises a single- or multilayer anti-reflective coating made of inorganic material.

When the lens comprises an abrasion-resistant coating in its structure, the anti-reflective coating is deposited onto the surface of the abrasion-resistant layer. Such layering reduces the impact strength by stiffening the system, which becomes breakable. This problem is well known in the industry of ophthalmic lenses made of organic glass.

A number of solutions have been proposed in the state of the art. They generally consist in applying an impact-resistant primer to the substrate of the lens and then applying the hard abrasion-resistant coating and, lastly, the anti-reflective coating.

Japanese Patents 63-141001 and 63-87223 describe plastic lenses comprising an impact-resistant primer based on thermoplastic polyurethane resin. U.S. Pat. No. 5,015,523 recommends acrylic impact-resistant primers and Application EP-040411 describes impact-resistant primers based on heat-curable polyurethane.

The processes of the prior art defined above have the disadvantages of employing impact-resistant primers which are thick and of being ill-adapted to the problems of use of these coatings on industrial scale.

In the actual industrial manufacture of ophthalmic lenses made of organic glass the glasses are generally coated with a hard abrasion-resistant layer, but the anti-reflective treatment is not systematic and is performed, to order, on stock glasses in a limited number.

Processes for the manufacture of the abrasion-resistant and anti-reflective lenses of the prior art employ a collection of stock glasses comprising not only a hard abrasion-resistant coating but also an impact-resistant primer, whereas only a proportion of these glasses has to be given an anti-reflective treatment.

A consequence of these techniques is a multiplicity of sometimes pointless operations, with the concomitant oncosts of production of the final glass.

On the industrial scale it would be desirable to search for a process for the manufacture of abrasion-resistant and anti-reflective ophthalmic lenses making it possible to employ, when required, stock glasses coated only with an abrasion-resistant layer for subsequent treatment with an anti-reflective coating.

SUMMARY OF INVENTION

The Applicant Company has now discovered, unexpectedly, that it is possible to insert an impact-resistant primer between the anti-reflective and hard coatings without modifying the function of this primer, in order to obtain an ophthalmic lens which is sufficiently resistant to abrasion and to impacts and which has satisfactory anti-reflective properties.

The Applicant Company has discovered that it is possible under these conditions to employ the primer layer in thicknesses which are substantially smaller than in the prior art.

The layering of the abrasion-resistant, impact-resistant primer and anti-reflective layers in accordance with the present invention makes it possible to produce ophthalmic lenses when required, on an industrial scale and at substantially reduced production costs, from stock glasses treated solely with an abrasion-resistant coating.

The subject of the present invention is therefore an ophthalmic lens made of organic glass with an impact-resistant primer inserted between an abrasion-resistant layer and an anti-reflective coating.

Another subject of the invention relates to a process for the manufacture of this lens.

Other subjects will become apparent in the light of the description.

DETAILED DESCRIPTION OF THE INVENTION

The ophthalmic lens in accordance with the present invention, consisting of a substrate made of organic glass, of a hard abrasion-resistant coating, of an impact-resistant primer and of an anti-reflective coating, is characterized essentially in that the surface of the substrate is covered with the hard abrasion-resistant layer and in that the impact-resistant primer layer is inserted between the said abrasion-resistant layer and the anti-reflective coating.

The substrates of the lenses in accordance with the present invention are substrates made of organic glass which are commonly employed for organic ophthalmic lenses.

By way of preference, there may be mentioned:

(1) the substrates obtained by polymerization of diethylene glycol bis(allylcarbonate), sold under the trade name CR-39 allyldiglycolcarbonate by the company PPG Industries Inc (ESSILOR ORMA® lenses);

(2) the glasses obtained by polymerization of acrylic monomers derived from bisphenol A, in particular those obtained by polymerization of a composition containing:

(A) a component (A) including: at least 50% by weight of a monomer or a mixture of monomers, corresponding to the formula (I):

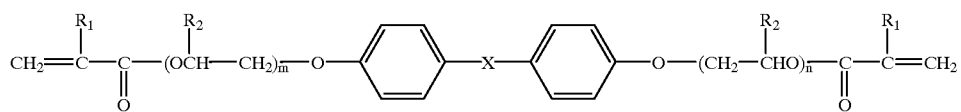

in which $R_1$ and $R_2$, which are identical or different, denote hydrogen or $C_1$–$C_6$ alkyl; X denotes

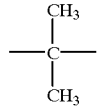

m+n are between 0 and 10

0 to 50% by weight of one or a number of mono- or polyfunctional vinyl, acrylic or methacrylic comonomer(s) (II);

(B) a component (B) present in proportions of 0.5 to 15% by weight, preferably 1 to 5% by weight relative to the weight of the components I+II, including a compound of formula (III):

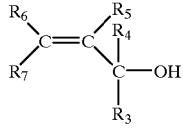

in which:

$R_3$ and $R_4$ denote hydrogen, or else one of the radicals $R_3$ or $R_4$ is a hydrogen atom while the other forms a ring with $R_7$ containing 5 to 10 carbon atoms, optionally substituted by one or a number of linear or branched $C_1$–$C_4$ alkyl group(s);

$R_5$, $R_6$ and $R_7$ are chosen, independently of one another, from the hydrogen atom and $C_1$–$C_6$ alkyl groups which may be substituted by one or more OH group(s) and the chain of which may optionally be interrupted by one or more ether, ester or keto group(s), it being possible for $R_7$ to form a $C_5$–$C_{10}$ ring optionally substituted by one or a number of linear or branched $C_1$–$C_4$ alkyl group(s), with one of the radicals $R_3$ or $R_4$.

(3) the glasses obtained by polymerization of allyl monomers derived from bisphenol A, such as those described in U.S. Pat. No. 4,959,429, and more particularly those obtained by polymerization of a composition containing:

(A) a component (A) including: at least 50% by weight of a monomer or a mixture of monomers, corresponding to the formula (I):

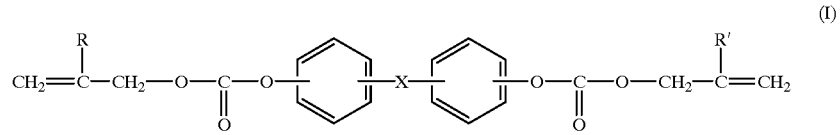

in which:
X denotes

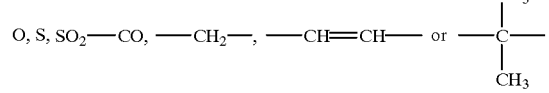

and R and R' are chosen from H and $CH_3$;

0 to 50% by weight of one or a number of mono- or polyfunctional allyl, vinyl, acrylic or methacrylic comonomer(s) (2);

(B) a component (B) including from 0.2 to 10% by weight, preferably 0.3 to 5% by weight relative to the weight of the components (1) and (2), of a compound of formula (3):

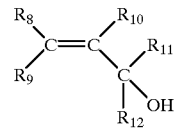

denote hydrogen or else one of the radicals;

$R_{11}$ or $R_{12}$ is a hydrogen atom, while the other forms a $C_5$ or $C_7$–$C_{10}$ ring with $R_9$, optionally substituted by one or a number of linear or branched $C_1$–$C_4$ alkyl group(s);

$R_8$, $R_9$ and $R_{10}$ are chosen, independently of one another, from the hydrogen atom and $C_1$–$C_6$ alkyl groups which may be substituted by one or more OH group(s) and the chain of which may optionally be interrupted by one or more ether, ester or keto group(s); it being possible for $R_9$ to form a $C_5$ or $C_7$–$C_{10}$ ring optionally substituted by one or a number of linear or branched alkyl group(s) with one of the groups $R_{11}$ or $R_{12}$.

Other examples of substrates that can be employed according to the invention which may be mentioned are:

(4) the substrates obtained from poly(methyl methacrylate);

(5) the substrates obtained from a polystyrene resin;

(6) the substrates obtained from a resin based on diallyl phthalate;

The composition of the impact-resistant inter-layer in accordance with the present invention is a thermoplastic or heat-curable polymeric composition.

To obtain a satisfactory impact strength it is desirable that the impact-resistant primer layer should have an intrinsic Bayer value lower than or equal to 2 and preferably between 1 and 2.

An intrinsic Bayer value is intended to mean the abrasion resistance of the impact-resistant interlayer, determined according to the Bayer test in accordance with ASTM standard F735.81, adapted as described below. The measurement is performed separately on a layer with a thickness of the order of 3 μm on an organic substrate such as CR39.

The Applicant Company has found that at low thicknesses, smaller than 1 μm in the case of the impact-resistant interlayer, the abrasion resistance is determined essentially by the hard coating onto which this interlayer is applied.

It is therefore possible, according to this invention, to obtain a final article exhibiting a satisfactory abrasion resistance although the intrinsic abrasion resistance of the impact-resistant interlayer deposited onto the hard varnish is low.

According to the present invention the thickness of the impact-resistant primer coating, which is obtained after curing, is preferably between 0.2 and 1 μm and more particularly between 0.4 and 0.8 μm.

The solids content of the thermoplastic or heat-curable impact-resistant primer composition is preferably between 5 and 20% by weight and more particularly between 10 and 15% by weight relative to the total weight of the composition.

The composition of the impact-resistant primer, in accordance with the present invention, may consist of a thermoplastic polyurethane resin obtained by reaction of a diisocyanate with a compound comprising a reactive hydrogen at each end.

This compound containing an active hydrogen may be of the alkylene glycol type, such as ethylene glycol, 1,2-propylene glycol, 1,3-butanediol, 1,4-butanediol, 1,6-hexanediol, neopentyl glycol, dipropylene glycol or diethylene glycol, of the polyalkylene glycol type, such as polypropylene glycol, polyethylene glycol or polytetramethylene glycol, of the poly(alkylene adipate) type, such as poly(diethylene adipate), poly(tetramethylene adipate), poly(hexamethylene adipate) or poly(neopentylene adipate), a poly-ε-caprolactone, of the polybutadiene glycol type, such as poly(1,4-butadiene) glycol or poly(1,2-butadiene) glycol, of the (alkylene carbonate) type, such as poly(hexamethylene carbonate), a silicone-treated polyol, or another known compound comprising an active hydrogen.

An example of diisocyanate which may be mentioned is an aromatic diisocyanate such as tolylene diisocyanate, xylylene diisocyanate, 4,4'-diphenylmethane diisocyanate, 1,5-naphthalene diisocyanate or 3,3'-dimethyl-4,4'-diphenyl diisocyanate, or an aliphatic diisocyanate such as 1,6-hexamethylene diisocyanate, isophorone diisocyanate, 4,4'-dicyclohexylmethane diisocyanate, 1,3-bis(isocyanatomethyl)cyclohexane or trimethylhexamethylene diisocyanate.

The thermoplastic polyurethane resin may be obtained by known processes, using metal compounds as catalysts.

To form the primer composition, the solution of thermoplastic polyurethane resin is diluted to a concentration which is adapted to the application. A hydrocarbon, a halogenated hydrocarbon, an alcohol, a ketone, an ester, an ether or another known solvent may be employed as solvent for dilution. It is particularly desirable to employ toluene, ethyl acetate, methyl ethyl ketone or tetrahydrofuran, separately or as a mixture. It is furthermore possible to add various known additives intended to improve the performance or the functions, like, for example, equalizing agents to facilitate the application, UV-absorbers and antioxidants to increase resistance to atmospheric agents, dyes etc.

The primer layer based on thermoplastic polyurethane resin may be applied by centrifuging, by dipping or by spraying.

After it has been applied onto the hard abrasion-resistant layer, the primer composition may be dried at a temperature of between 30 and 200° C., preferably between 60 and 150° C. and preferably for 1 to 60 minutes, depending on the solvent employed.

The impact-resistant primer composition of the invention may consist of a blocked polyisocyanate and of a polyol. The mixture is crosslinked by heating to form a primer. This is a heat-curable polyurethane.

The blocked polyisocyanates are chosen from the addition products obtained by linking two or more molecules of hexamethylene diisocyanate, oz isophorone diisocyanate, of 4,4'-dicyclohexylmethane diisocyanate, of hydrogenated xylene diisocyanate and of isocyanurates, of allophanates, of biurets and of carbodiimides which are blocked with acetoacetic acid, malonic acid or oximes. The preferred blocked polyisocyanates contain hexamethylene diisocyanate blocked with an oxime.

The polyols are chosen from compounds which have a plurality of hydroxyl groups per molecule and a polyester, polyether, polycaprolactone, polycarbonate or polyacrylate backbone.

The polyisocyanate/polyol molar ratio is preferably such that the molar ratio of the isocyanate groups to the hydroxyl groups is between 0.8 and 1.25.

A crosslinking initiator may be employed in the reaction of the blocked polyisocyanate with the polyol. Preferred examples of initiators are tertiary amines and tin- or zinc-based organic compounds.

The primer composition is diluted to a concentration which is adapted to the application. For example, alcohols, ketones or esters may be employed as solvent. Diacetone alcohol, ethyl acetate and methyl ethyl ketone are particularly preferred. The solvents may be employed on their own or as mixtures. It is also possible to add various known additives such as those mentioned above.

The primer is applied according to conventional coating processes such as centrifuging, dipping or spraying. It is formed on the hard abrasion-resistant layer by drying, if necessary, and heating to a temperature of between 100 and 140° C.; the crosslinking period preferably varies between 15 and 90 minutes.

The primer composition according to the invention may also consist of copolymers, of acrylic and/or of methacrylic monomers and of aromatic vinyl compounds. Examples of acrylic and methacrylic monomers are the esters of acrylic or methacrylic acid with lower alcohols and the esters formed from acrylic or methacrylic acid and hydroxylated aromatic compounds such as benzyl alcohols. Styrene, chlorostyrene and bromostyrene may be mentioned among the vinyl compounds. Such primer compositions are described in U.S. Pat. No. 5,015,523.

They are applied according to conventional coating methods onto the hard abrasion-resistant layer of the lens. The impact-resistant primer 's formed by drying and crosslinking at a temperature between the ambient temperature and 100° C. for, preferably, 5 minutes to 2 hours.

A particularly preferred form of the invention consists in employing an impact-resistant primer composition based on polysiloxane.

For preference, compositions containing one or more silane hydrolysate(s) in a solvent medium and which do not contain fillers such as silica ($SiO_2$) are employed. It is preferred to employ silane hydrolysates with epoxy groups containing at least one Si-alkyl group like, for example, glycidoxypropyldimethyldiethoxysilane.

The hard abrasion-resistant coating employed according to the present invention is obtained by curing a composition containing:
- A/ colloidal silica which has a mean particle diameter of 1 to 100 mμm;
- B/ a solvent;
- C/ a hydrolysate or a mixture of hydrolysates of silane compound(s);

of formula:

$$R^1\text{—}Si(R^3)_a\text{—}(OR^2)_{3-a} \quad (\alpha)$$

in which:
$R^1$ denotes an organic group containing an epoxy group;
$R^2$ is a hydrocarbon radical which has 1 or 2 carbon atoms;
$R^3$ is a hydrocarbon group which has from 1 to 4 carbon atoms, and a is 0 or 1 in value.

The structure of the silica is preferably $SiO_2$. The colloidal silica is obtained by macromolecular dispersion of anhydrous silica in a dispersing medium. This dispersing medium may be water, an alcohol, a cellosolve, a ketone, an ester, a carbitol or the like, or mixtures thereof.

The silane compounds which are more particularly preferred contain an epoxy group of formula:

$$\text{—}(CH_2)_p\text{—}(OCH_2CH_2)_r\text{—}OCH_2\text{—}CH\text{—}CH_2$$
$$\diagdown O \diagup$$

or $$\text{—}(CH_2)_q\text{—}\langle\text{cyclohexyl}\rangle\text{—}O$$

where p and q are 1 to 6 and r is 0 to 2.

Among the examples of hydrolyzed silane compounds in accordance with the invention there may be mentioned:
- -γ-glycidoxypropyltrimethoxysilane,
- -γ-glycidoxypropyltriethoxysilane,
- -γ-glycidoxypropyl(methyl)dimethoxysilane,
- -γ-glycidoxypropyl(methyl)diethoxysilane,
- -β-(3,4-epoxycyclohexyl)ethyltrimethoxysilane, or the like.

The hard abrasion-resistant coating compositions preferably contain additives for prolonging the storage life, such as β-diketone and β-ketoester chelating agents, or mixtures thereof.

Examples which may be mentioned are acetylacetone, ethyl acetoacetate or the like.

The hydrolysates of silane compounds of formula (α) are obtained by hydrolysis in the dispersing medium for the colloidal silica.

The hydrolysis is performed by adding water and an acid catalyst such as hydrochloric, sulfuric, nitric, phosphoric or acetic acid.

Crosslinking catalysts may be introduced into these compositions to reduce the cure temperature and period. It is possible to mention Bronsted acids such as hydrochloric acid, sulfuric acid and nitric acid, Lewis acids such as aluminum chloride, tin chloride, zinc borofluoride, boron fluoride, acid halide compounds, chelated acetylacetone and acetoacetate compounds, carboxylic compounds of magnesium, titanium, zirconium and tin, and sodium, magnesium, copper, zinc, hydrogen and lithium perchlorates.

The hard coating compositions may additionally contain additives such as ultraviolet-absorbers, silicone or fluorinated surfactants, dyes, pigments and refractive index modifiers.

The methods of application of the abrasion-resistant layer onto the lens substrate are identical with those for the impact-resistant primer, as referred to above.

The curing of the abrasion-resistant layer is preferably carried out at a temperature of 80 to 150° C. for 30 minutes to 2 h 30 min.

After curing, the thickness of the abrasion-resistant layer deposited on the surface of the substrate is preferably chosen to be between 1 and 15 μm and more particularly between 2 and 6 μm.

After curing of the impact-resistant primer on the abrasion-resistant layer, in accordance with the invention, an anti-reflective coating is formed on the surface of the impact-resistant primer.

The anti-reflective coating consists of a mono- or multi-layer film of dielectric materials such as SiO, $SiO_2$, $Si_3N_4$, $TiO_2$, $ZrO_2$, $Al_2O_3$, $MgF_2$ or $Ta_2O_5$, or mixtures thereof. It thus becomes possible to prevent the appearance of a reflection at the lens-air interface.

The anti-reflective coating is applied in particular by vacuum deposition according to one of the following techniques:
- 1/ By evaporation, optionally ion beam-assisted.
- 2/ By spraying using an ion beam.
- 3/ By cathodic sputtering.
- 4/ By plasma-assisted vapor-phase chemical deposition.

Besides vacuum deposition it is also possible to envisage a deposition of an inorganic layer by a sol gel route (for example from tetraethoxysilane hydrolysates).

In the case where the film includes a single layer, its optical thickness must be equal to λ/4 where λ is a wavelength of between 450 and 650 nm.

In the case of a multilayer film comprising three layers, a combination may be employed corresponding to optical thicknesses λ/4-λ/2-λ/4 or λ/4-λ/4-λ/4 respectively.

It is additionally possible to employ an eguivalent film made up of more layers, instead of any one of the layers forming part of the abovementioned three layers.

Another subject of the invention is a process for the manufacture of an ophthalmic lens made of organic glass, as defined above, which consists, in a first step, in applying a hard abrasion-resistant layer onto the surface of the substrate made of organic glass, then in depositing a layer of impact-resistant primer onto the abrasion-resistant layer and, lastly, in depositing an anti-reflective coating onto the impact-resistant primer.

According to a preferred method of the invention, the various layers of the ophthalmic lens are applied after a specific surface-activation treatment permitting better adhesion of the layer deposited subsequently.

This type of treatment is performed in particular:
- on the hard coating surface before application of the impact-resistant interlayer;
- on the impact-resistant interlayer surface before application of the anti-reflective varnish.

The surface-activation treatments may be chemical or physical. Examples which may be mentioned are:

a chemical etching for a few minutes (2 to 3 minutes) at temperatures close to 50° C. in a 5% sodium hydroxide bath in the presence of surface-active agents;

an oxygen plasma treatment;

an IPC (Ion Pre-Cleaning) treatment which is an ion bombardment in a vacuum vessel.

In the case of an activation treatment of the hard abrasion-resistant layer, according to the process for the manufacture of lenses of the invention, an abrasion-resistant varnish which has a colloidal silica content of between 0 and 40% by weight in the solids content, preferably between 10 and 30% by weight, is preferably employed in order to obtain a better impact strength.

The examples which follow serve to illustrate the invention in greater detail but without any limitation being implied.

In order to assess the properties of the coated glasses obtained in the examples, the following were measured:

the abrasion resistance, using the value obtained in the Bayer test.

The Bayer test consists in subjecting a series of test and control glasses to the abrasion caused by moving sand.

The test is assessed by measuring, in comparison, the scatter of the test and control glasses before and after abrasion.

The procedure according to ASTM standard F 735.81 is followed, adapted as follows:

A product is evaluated on a series of afocal glasses of 65 mm diameter and with a radius of curvature of between 80 mm and 125 mm.

All coated glass (test glass) is abraded at the same time as a control glass (organic glass of ORMA® type).

The procedure is as follows:

1/ The glasses are dipped in a beaker of isopropyl alcohol and then wiped with a clean cloth.

2/ The pair of glasses (control/test) is immobilized horizontally on the Bayer tray.

Sand is added.

150 to-and-fro moves are performed.

The glasses are then turned over.

150 more to-and-fro moves are performed.

3/ The glass is next washed with water, dipped in a beaker of isopropyl alcohol and then wiped with a clean cloth.

4/ The scatter of the glasses is measured.

The abrasion resistance is quantified using the Bayer value.

If the notation is:

$$D_{test} = \text{scatter after abrasion of the test glass} - \text{scatter before abrasion of the test glass}$$

$$D_{con} = \text{scatter after abrasion of the control glass} - \text{scatter before abrasion of the control glass}$$

then the Bayer value is $R = D_{con}/D_{test}$.

A high value in the Bayer test corresponds to a high degree of abrasion resistance.

The Bayer value of an organic glass of the ORMA® type, uncoated, is equal to 1.

the impact strength using the ball drop test. Balls are dropped with increasing energy onto the middle of the coated glass until it shows a star-shaped crack or breaks. The minimum energy applied during this test is 15.2 g m (corresponding to the initial drop height).

The mean energy of breakage of the coated glass is then calculated.

the abrasion resistance using the intrinsic value obtained in the Bayer test, for the impact-resistant interlayer.

This is measured, in each example, on a layer of 3 $\mu$m thickness applied onto a glass of the ORMA® type.

The proportions, percentages and quantities mentioned in the examples are proportions, percentages and quantities by weight.

EXAMPLE 1

(1) Manufacture of the abrasion-resistant varnish deposited onto the substrate (varnish A)

299.1 g of γ-glycidyloxypropylmethyldiethoxysilane (which will be referred to in what follows as methyl GLYMO), 30 g of hexanediol diglycidyl ether and 43.4 g of 0.01N HCl are mixed. This mixture is stirred and heated for 5 hours at 45° C. The stirring is continued and the mixture is allowed to cool to ambient temperature for 24 hours.

The following are then added: 200 g of colloidal silica with a solids content of 30% in methanol, sold under the name Sun Colloid MA-ST by the Nissan company, 22.45 g of aluminum acetylacetonate, 55.3 g of methyl ethyl ketone, 348.7 g of methanol and 1 g of Baysilone OL31 surfactant. This mixture is stirred and is filtered.

(2) Manufacture of the impact-resistant primer (layer B)

273.7 g of methyl GLYMO, 48 g of hexanediol diglycidyl ether and 39.7 g of 0.01N HCl are mixed. This mixture is stirred and heated for 5 hours at 45° C. The mixture is then allowed to cool for 24 hours. 16.9 g of aluminum acetylacetonate, 50.7 g of methyl ethyl ketone and 1 g of Baysilone OL31 surfactant are added next. This mixture is stirred and is filtered.

It is then diluted in methanol to a solids content of 10%. The intrinsic Bayer value is 1.4.

(3) Process for the manufacture of lenses

The varnish A is deposited onto glasses made of CR39 (ORMA® lenses) of 1 mm thickness in the center, which have been subjected to an alkaline preparation to make it easier for the varnish to adhere. The thickness of the varnish A deposited is 2 $\mu$m, the varnishing being carried out by dipping.

The varnish A is next crosslinked in an oven for 1 hour at 80° C. After this cure the varnish undergoes an alkaline preparation to promote the adhesion of the impact-resistant primer B.

The interlayer B is deposited by dipping. The dewetting speed is 10 cm/min and the thickness obtained is 0.7 $\mu$m.

The glasses are next treated in the oven for 3 hours at 100° C.

After curing, the glasses are subjected to an anti-reflective treatment by vacuum evaporation.

The anti-reflection is obtained by vacuum deposition of a first layer based on zirconium and titanium oxides;

of a second layer based on $SiO_2$;

the optical thickness in the case of these two layers taken together being close to $\lambda/4$;

of a third layer based on $TiO_2$, of $\lambda/2$ optical thickness;

of a fourth layer based on $SiO_2$, of $\lambda/4$ optical thickness.

The impact strengths are determined by the ball drop test using the mean energy of rupture E of the coated glasses, expressed in g m.

The anti-reflection-treated glasses, according to the invention, are compared with anti-reflection-treated glasses not comprising any interlayer B.

The following results are obtained:

ORMA® glass+varnish A+anti-reflection:
E<15.2 g m (1st test height)

ORMA® glass+varnish A+layer B+anti-reflection: E=32 g m.

EXAMPLE 2

(1) Abrasion-resistant varnish A

The varnish A is prepared in the same way as in Example 1.

(2) Impact-resistant interlayer (layer C)

5.4 g of polyethylene g-ycol 200, 7.06 g of 4,4'-dicyclohexylmethane diisocyanate, sold under the name DW by Solvay, 78.7 g of dioxane, 8.7 g of dibutyltin dilaurate and 0.11 g of BYK 300 surfactant are mixed.

After this mixture has been filtered, it is diluted with dioxane to a solids content of 4%. The intrinsic Bayer value is 1.1.

(3) Manufacture of the lenses

The varnish A is deposited onto ORMA® glasses of 1 mm thickness at the center, under the same conditions as in Example 1.

The layer C is deposited by centrifuging solely on the concave face of the glass; the thickness is 0.47 μm.

The glasses are then heated to 100° C. in the oven for 3 hours.

After curing, an anti-reflective treatment is deposited by vacuum deposition under the same conditions as Example 1, and the ball drop test is then performed.

Glasses covered with varnish A and then anti-reflection treated are compared with glasses covered with varnish A, with layer C and anti-reflection treated.

The mean energies of rupture are measured

ORMA® glass+varnish A+anti-reflection:
E<15.2 g m (1st test height)

ORMA® glass+varnish A+layer C+anti-reflection: E=44.7 g m.

EXAMPLE 3

(1) Abrasion-resistant varnish A'

The following are mixed:

341.9 g of methyl GLYMO, 49.6 g of 0.01N HCl

This mixture is added while being heated for 5 hours at 45° C. 200 g of MA-ST colloidal silica in methanol are next introduced.

The materials are allowed to cool to ambient temperature for 24 hours.

The varnish is completed by addinc 21.1 g of aluminum acetylacetonate, 63.2 g of methyl ethyl ketone, 323.2 g of methanol, 1 g of Baysilone OL-31 surfactant.

This varnish is filtered when the mixture is satisfactorily homogeneous.

(2) Impact-resistant interlayer D 113.05 g of glycidoxypropyltrimethoxysilane and 25.85 g of 0.01N HCl are mixed. The temperature rises to 40° C. during this mixing.

The varnish is left to stand for 24 hours at ambient temperature.

The following are then added:

18.17 g of itaconic acid, 5.65 g of dicyandiamide, 0.8 g of FC-430 surfactant.

A dilution with methanol is next carried out to a solids content of 10%.

The intrinsic Bayer value is 1.8.

(3) Manufacture of the lenses

The same process is employed as in Example 1 for depositing the varnish A' onto the ORMA glasses.

The thickness of the varnish A' is 2.3 μm.

The interlayer D is deposited by dip-coating (dipping) with a dewetting speed of 11 cm/min. The thickness obtained is 0.67 μm.

The system is crosslinked in an oven for 3 hours at 100° C.

When abrasion-resistance tests are performed on the glasses thus produced, satisfactory properties are obtained:

Bayer value =1.93.

When an anti-reflective treatment is deposited under the conditions of Example 1 and when the mean energy of rupture E is measured, the following results are obtained:

ORMA® glasses+varnish A'+anti-reflection:
E<15.2 g m (1st test height)

ORMA® glasses+varnish A'+D+anti-reflection: E=20.3 g m.

What is claimed is:

1. Ophthalmic lens consisting of a substrate made of organic glass, of an abrasion-resistant coating, of a layer of impact-resistant primer and of an inorganic antireflective coating, wherein the surface of the said substrate is covered with the abrasion-resistant coating and in that the impact-resistant primer layer is inserted between the said abrasion-resistant layer and the anti-reflective coating, wherein the abrasion-resistant coating comprises a hydrolyzate or a mixture of hydrolyzates of a silane compound of formula:

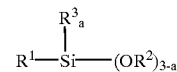

in which:

$R^1$ denotes an organic group containing an epoxy group;

$R^2$ is a hydrocarbon radical which has 1 or 2 carbon atoms;

$R^3$ is a hydrocarbon group which has from 1 to 4 carbon atoms, and a is 0 or 1 in value.

2. Lens according to claim 1, wherein the substrate is chosen from:

(I) the glasses obtained by polymerization of diethylene glycol bis(allyl carbonate);

(II) the glasses obtained by polymerization of acrylic monomers derived from bisphenol A; or (III) the glasses obtained by polymerization of allyl monomers derived from bisphenol A.

3. Lens according to claim 1, wherein the substrate is chosen from:

(A) the glasses obtained from poly(methyl methacrylate);

(B) the glasses obtained from polystyrene resin; or (C) the glasses made of resin based on diallyl phthalate.

4. Lens according to claim 1, wherein the impact-resistant interlayer has an intrinsic Bayer value lower than or equal to 2, at a thickness of 3 μm.

5. Lens according to claim 1, wherein the impact-resistant primer is a thermoplastic or heat-curable polymer composition which has a solids content of between 5 and 20% by weight relative to the total weight of the primer composition.

6. Lens according to claim 1, wherein the thickness of the impact-resistant interlayer in the cured state is between 0.2 and 1 μm.

7. Lens according to claim 1, wherein the composition of the impact-resistant primer consists of a thermoplastic polyurethane resin obtained by reaction of a diisocyanate with a compound comprising a reactive hydrogen at each end.

8. Lens according to claim 1, wherein the composition of the impact-resistant primer consists of a heat-curable polyurethane resin obtained by reaction of a blocked polyisocyanate and of a polyol.

9. Lens according to claim 1, wherein the composition of the impact-resistant primer consists of a copolymer of acrylic and/or methacrylic monomers and of aromatic vinyl compounds.

10. Lens according to claim 1, wherein the composition of the impact-resistant primer consists of a polysiloxane.

11. Lens according to claim 10, wherein the composition of the impact-resistant primer contains, in a solvent medium, one or a number of silane hydrolysate(s) with an epoxy group containing at least one Si-alkyl group and containing no fillers.

12. Lens according to claim 1, wherein the hard abrasion-resistant coating is obtained by curing a composition containing:
   a) colloidal silica which has a mean particle diameter of between 1 and 100 m$\mu$m;
   b) a solvent;
   c) a hydrolysate or a mixture of hydrolysates of silane compound(s) of formula:

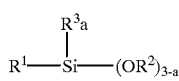

(α)

in which:
   $R^1$ denotes an organic group containing an epoxy group;
   $R^2$ is a hydrocarbon radical which has 1 or 2 carbon atoms;
   $R^3$ is a hydrocarbon group which has from 1 to 4 carbon atoms, and a is 0 or 1 in value.

13. Lens according to claim 1, wherein the thickness of the abrasion-resistant layer, in the cured state, is between 1 and 15 $\mu$m.

14. Lena according to claim 12, wherein the composition of the abrasive-resistant costing has a colloidal silica content of between 0 and 40% by weight in the solids content.

15. Lens according to claim 1, wherein the anti-reflective coating consists of a mono- or multilayer film based on dielectric materials and deposited by vacuum deposition.

16. Lens according to claim 1, wherein it successively includes:

a) a substrate made of glass obtained by polymerization of diethylene glycol bis (allyl carbonate);

b) a hard abrasion-resistant coating obtained by curing a composition containing, in methanol, colloidal silica and a hydrolysate of γ-glycidyloxypropylmethyldiethoxysilane;

c) an impact-resistant interlayer obtained by curing a composition containing, in methanol, a hydrolysate of γ-glycidyloxypropylmethyldiethoxysilane or of γ-glycidoxypropyltrimethoxysilane; and d) a multilayer anti-reflective coating.

17. Lens according to claim 1, wherein it successively includes:

a) a substrate made of glass obtained by polymerization of diethylene glycol bis (allyl carbonate);

b) an abrasion-resistant coating obtained by curing a composition containing, in methanol, colloidal silica and a hydrolysate of γ-glycidoxypropylmethyldiethoxysilane;

c) an impact-resistant interlayer obtained by 35 curing a composition containing 4,4'-dicyclohexylmethane diisocyanate and polyethylene glycol; and d) a multilayer anti-reflective coating.

18. Process for the manufacture of an ophthalmic lens as defined according to claim 1, characterized in that the abrasion-resistant coating is applied onto the surface of the organic glass substrate, in that the layer of impact-resistant primer is deposited onto the abrasion-resistant layer and in that the anti-reflective coating is then deposited onto the impact-resistant primer.

19. Process according to claim 18, wherein the abrasion-resistant layer and the layer of impact-resistant primer are deposited by centrifuging, by dipping or by spraying and in that the anti-reflection is applied by vacuum deposition.

20. Process according to claim 18, wherein the abrasion-resistant and impact-resistant primer layers are pretreated using a surface activation treatment by a chemical or physical route.

21. Process according to claim 20, wherein the surface activation treatment is an alkaline chemical etching, an oxygen plasma treatment or an ion bombardment in a vacuum vessel.

* * * * *